May 12, 1931.  C. L. HUNSICKER  1,804,691

OPHTHALMOLOGICAL INSTRUMENT

Filed May 4, 1927   3 Sheets-Sheet 1

INVENTOR
Clyde L. Hunsicker
BY
White, Prost & Fryer
his ATTORNEYS

May 12, 1931.  C. L. HUNSICKER  1,804,691
OPHTHALMOLOGICAL INSTRUMENT
Filed May 4, 1927  3 Sheets-Sheet 2
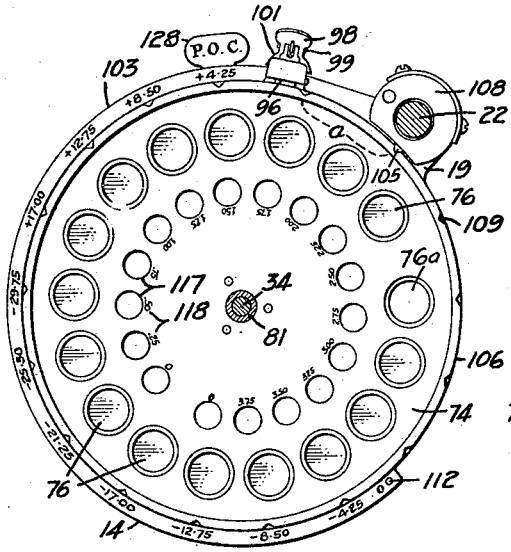
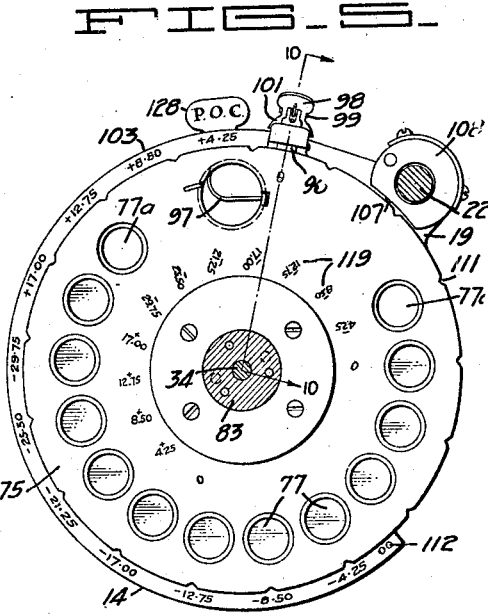
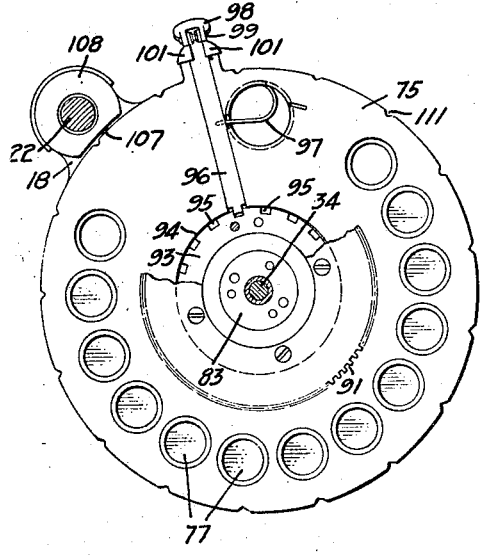
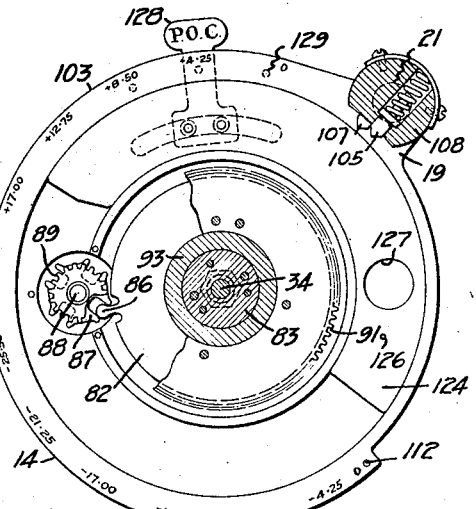
INVENTOR
Clyde L. Hunsicker
BY White, Prost & Fryer
his ATTORNEYS May 12, 1931.  C. L. HUNSICKER  1,804,691
OPHTHALMOLOGICAL INSTRUMENT
Filed May 4, 1927   3 Sheets-Sheet 3
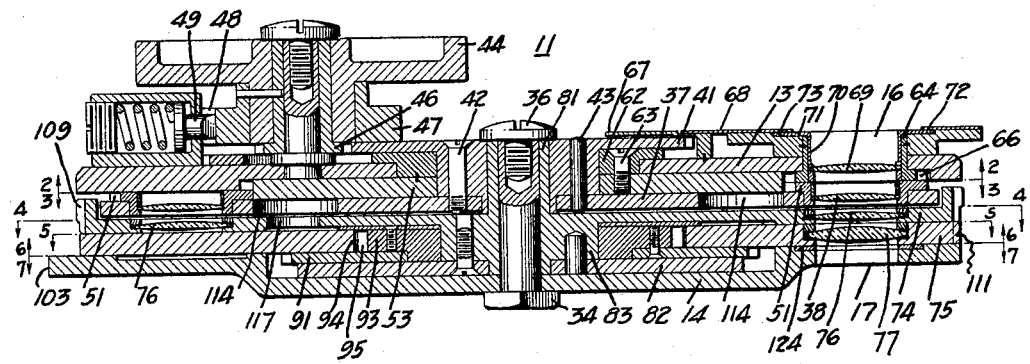
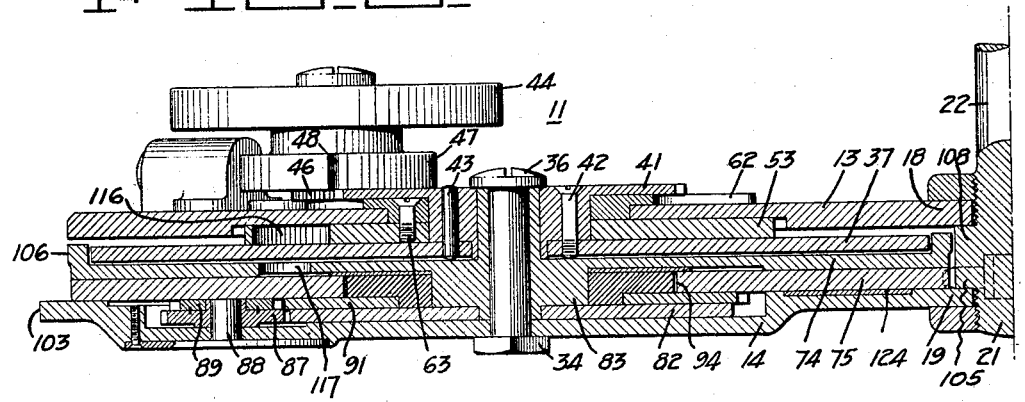
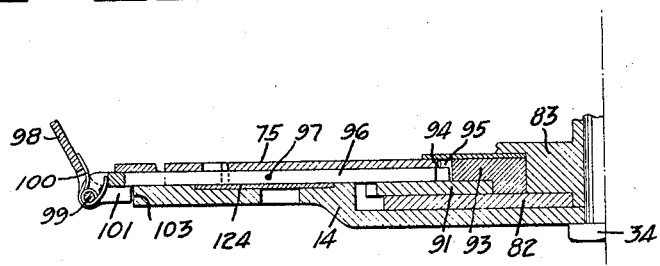
INVENTOR
Clyde L. Hunsicker
BY White, Prost & Fryer
his ATTORNEYS Patented May 12, 1931

1,804,691

UNITED STATES PATENT OFFICE

CLYDE L. HUNSICKER, OF SAN FRANCISCO, CALIFORNIA

OPHTHALMOLOGICAL INSTRUMENT

Application filed May 4, 1927. Serial No. 188,734.

This invention relates generally to optical instruments commonly known as optometers, which are used in testing eyes in order to determine the correct value of corrective lenses. It relates particularly to optometers of the type in which a plurality of lenses are mounted within a casing and are adapted to be controlled by an operator to secure different refractive powers.

It is an object of this invention to generally improve upon the construction of optometers and to produce a compact convenient instrument of this kind which will facilitate making accurate prescriptions for the eyes in a minimum of time.

It is a further object of this invention to devise an optometer which will have such a wide range of refractive power that it may be used in practically all cases of eye testing.

It is a further object of this invention to minimize the time necessary to adjust an optometer by providing selecting means for moving a major lens carrying member independently of a minor lens carrying member, in addition to a mechanical connection between the members.

It is a further object of this invention to devise improved means in an optometer for mounting the cylindrical lenses and for rotating these lenses about their axes.

It is a further object of this invention to provide an optometer with means for facilitating adjustment of the lens holding devices to the proper pupillary distance of a patient.

Further objects of this invention will appear from the following description in which I have set forth the preferred embodiment of my invention. It is to be understood that the appended claims are to be accorded a range of equivalents consistent with the state of the prior art.

Referring to the drawings:

Fig. 4 is a section taken along the line 4—4 of Fig. 8 showing the minor lens carrying member.

Fig. 5 is a section taken along the line 5—5 of Fig. 8 showing the major lens carrying member.

Fig. 6 is a section taken along the line 6—6 of Fig. 8, showing the rear side of the major lens carrying member, parts being broken away.

Fig. 7 is a section taken along the line 7—7 of Fig. 8 showing the intermittent movement for mechanically connecting the minor and major lens carrying members.

Fig. 8 is a transverse cross section taken along the line 8—8 of Fig. 1.

Fig. 9 is a transverse cross sectional view taken along the line 9—9 of Fig. 1.

Fig. 10 is a detail section taken along the line 10—10 of Fig. 5.

Figure 1:
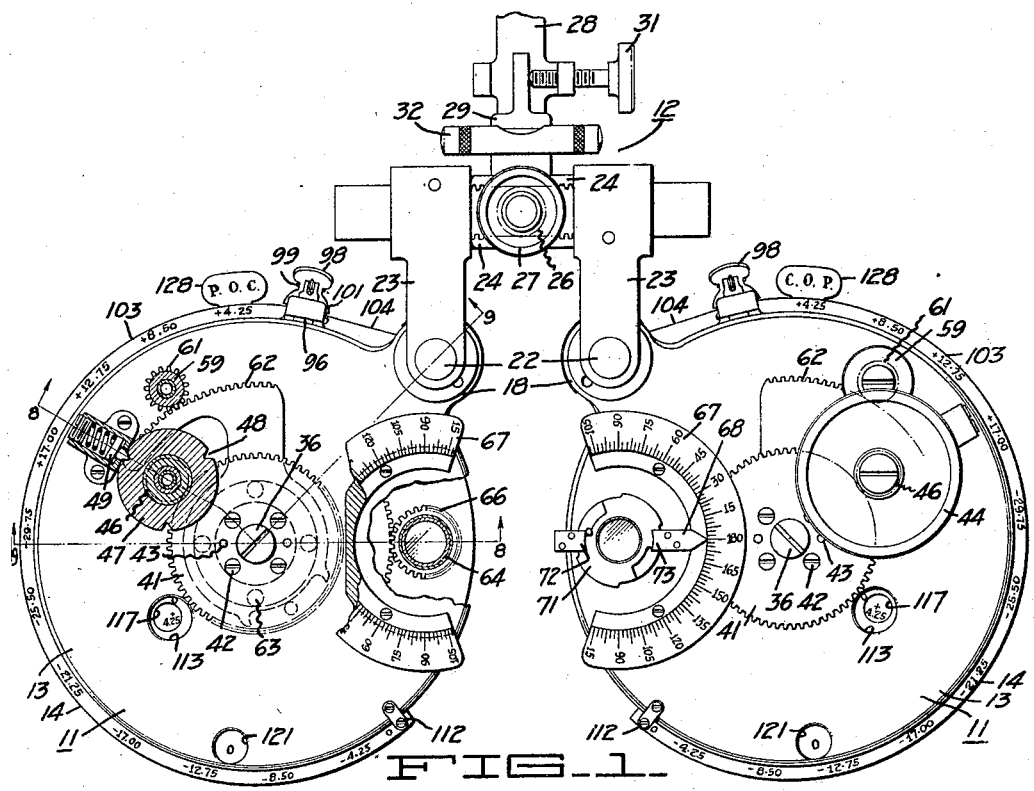
Figure 1 is a front elevational view of a complete instrument embodying the invention, certain parts being broken away.
Figure 2:
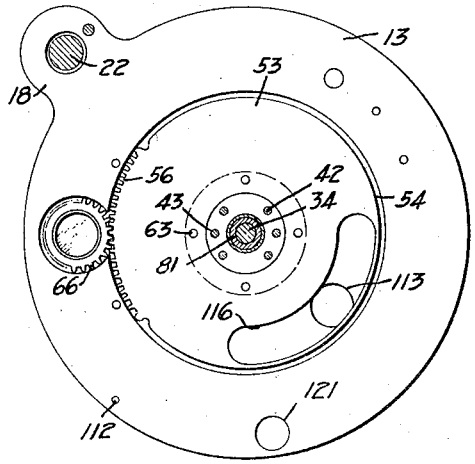
Fig. 2 is a section taken along the line 2—2 of Fig. 8 and showing the drive for the means for indicating the axial relationship of the cylindrical gears.

The invention may be outlined generally as comprising a pair of lens holding devices, one device being supplied for each eye of the patient. The construction of each of these devices includes a casing having an opening therethrough for passage of light, within which casing there is disposed a plurality of movable lens carrying members. Spherical lenses of different powers are mounted on at least two of these members and are spaced circumferentially thereon so that they may be brought into individual registry with the casing opening. The spherical lenses on one of these members are graded finely and have been termed "minor lenses" in the subsequent description, while the lenses of the other member are graded coarsely and have been termed "major lenses". A mechanical connection is provided between the two spherical lens carrying members so that when one member has been mechanically rotated to bring all of its lenses into successive registry with the opening, the major lens carrying member is moved annularly a sufficient distance to bring the next major lens into registry with the opening. As an important feature of this invention, means is provided for disengaging this mechanical connection so that the major lens holding member may be selectively oscillated to any desired position so as to secure the approximate refractive power without the necessity of moving the minor lens carrying member. The cylindrical lenses of different powers are disposed in spaced relationship upon a third rotatable member and are adapted to be brought into successive registry with the casing opening, and if desired, they may be superposed with spherical lenses. An adjustment is also provided so that these cylindrical lenses may be rotated about their axis when in registry with the opening. A special feature of this adjustment is that it does not rotate all of the lenses simultaneously, but only those lenses which are adjacent to the casing opening.

Referring to the drawing for a more complete description, there is shown a pair of lens holding devices 11 which are supported by means of an adjustable bracket 12. These devices are identical and each include a casing made up of spaced front and back plates 13 and 14 between which the lens carrying members and mechanism are mounted. These plates are provided with alined apertures 16 so as to form a clear opening 17 extending through the casing, and the various lenses are adapted to be brought into registry with this opening. For attaching the casing to the bracket 12, the plates 13 and 14 are provided with aperture tabs 18 and 19 through which extend the bolt 21. Bolt 21 is provided with an extension rod 22 which is attached to the depending arms 23 of the adjustable bracket 12. These arms are adjusted laterally by having the same connected to racks 24 which engage a pinion 26, this pinion being manually rotated by means of the knob 27. The racks 24 and arms 23 are pivotally mounted to a support member 28 so as to be rotatable about a horizontal axis alined with the axis of the pinion 26. The racks 24 are slidably mounted upon an arm 29 which is adjustable with respect to the support member 28, as by means of a setscrew 31. A suitable level gauge 32 is mounted upon arm 29, so that an operator may readily adjust the devices 11 to the same level by adjusting the screw 31. As has been previously explained there are two lens systems mounted within the casing of each device, one system being cylindrical and the other spherical. While these systems are brought into co-operative relationship with each other, they may be separately described.

Cylindrical lens system

The central portions of the two plates 13 and 14 are retained together by means of a bolt 34 which is retained in place by means of the removable capscrew 36. Disposed within the casing adjacent the inner face of the top plate 13, there is a lens carrying member 37 which is preferably rotatably mounted on an axis concentric with the bolt 34. A plurality of cylindrical lenses 38 of graded powers, are spaced around the face of disc 37 and are adapted to be brought into registry with opening 17. The mounting for these lenses whereby they may be individually rotated independently of disc 37, will be presently described.

For manually rotating the lens carrying member 37, there is provided a gear 41 which is arranged externally of the front casing plate 13, and which is fixed with respect to member 37 as by means of screws 42 and dowel pins 43. Rotatably mounted upon the front face of plate 13, there is a control knob 44 carrying a pinion 46 adapted to mesh with the gear 41. Knob 44 is also provided with a circular member 47 which is provided with a plurality of circumferentially spaced notches 48 adapted to be engaged by a spring pressed detent 49. The driving ratio between pinion 46 and gear 41 is such that the detent 49 engages a notch whenever a cylindrical lens becomes alined with the aperture 17.

Figure 3:
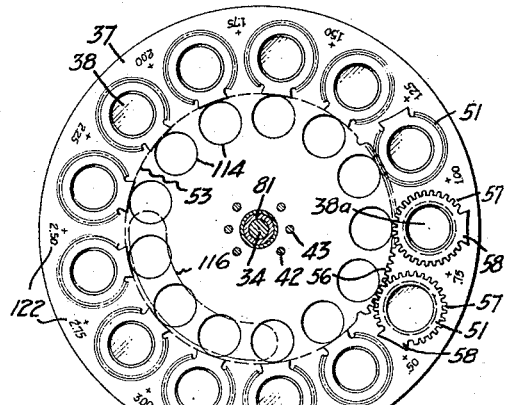
Fig. 3 is a section taken along the line 3—3 of Fig. 8 and showing the planetary gear drive for the cylindrical lenses.

In order to individually rotate the cylindrical lenses, I have provided a planetary gear mechanism, which however differs from the ordinary planetary gears provided on such instruments in that when an alined lens is being rotated, the majority of the other lenses remain relatively stationary. Referring now to Figs. 3 and 4, it will be observed that the individual cylindrical lenses are mounted within ring or sun gears 51 which are journaled within the lens carrying member, and are provided with external gear teeth. Journaled concentrically with respect to the lens carrying member 37, and disposed between this member and the front casing plate 13, there is a center gear 53 having its periphery formed with a blank portion 54, and a segmental toothed portion 56. Each of the rings 51 is also provided with a toothed peripheral portion 57 having substantially the same number of teeth as is provided in the toothed segmental portion 56. Each ring is also provided with a projecting blank portion 58 which is adapted to fit against the blank peripheral portion 54 of center gear 53, when the rings are not adjacent to the casing opening. Ordinarily if the lens carrying member 37 is rotated while the center gear 53 remains stationary, the ring gears 51 will be rotated relative to member 37, as they pass the toothed segmental portion 56. However in moving about the remainder of center gear 53, they remain relatively stationary with respect to the member 37. Likewise if the center gear 53 is rotated while the lens carrying member 37 remains stationary, the majority of the ring gears 51 remain stationary while those gears adjacent to the aperture 16 are rotated about their axes. Sufficient teeth are provided in the segmental portion 56 so that the gear ring which is registered with the opening 17, may be rotated through an angle of at least 180 degrees. Rotation of the center gear 53 is effected by means of a control knob 59 which is rotatably mounted upon the front plate 13. This knob carries a pinion 61 which meshes with a gear segment 62. This gear segment 62 is preferably disposed between the gear 41 and the face of plate 13, and is fixed with respect to center gear 53 as by means of screws 63.

In order to provide visual means for indicating the angular position of the axis of a cylindrical lens being employed, suitable means is provided which includes a tube 64 which is journaled within the aperture 16 of plate 13. The inner portion of tube 64 carries a pinion 66 which meshes with the center gear 53. An indicating scale there is a pointer 68 which is secured to the outer portion of tube 64. If desired an additional lens may be inserted in tube 64, and for this purpose I have shown in Fig. 8 an additional lens 69 which is mounted within a sleeve 70, this sleeve having tabs 71 which serve to removably lock the sleeve within tube 64. Tabs 71 may engage beneath the projecting portions 72 and 73 carried by tube 64.

*Spherical lens system*

Disposed between the rotatable member 37 and the back plate 14, are the two superposed disc-like rotatable members 74 and 75. The member 74 carries a plurality of finely graded spherical lenses 76, which will be subsequently referred to as "minor" lenses, and member 75 carries a plurality of coarsely graded lenses 77 which will be subsequently referred to as "major" lenses. In practice a sufficiently fine variation in lens power can be obtained by having successive minor lenses differed by about .25 diopters, and all of the minor lenses may be positive. The difference in powers between successive lenses of the member 75 will depend upon the number of minor lenses provided. For every complete revolution of the minor lens holding member, the major lens carrying member is intended to be moved an angular distance sufficient to bring the next major lens in registry with the casing opening. Therefore to maintain an even grading in refractive power the difference between successive major lenses should be substantially equal to the difference between the weakest and strongest lens of the minor series plus twice the difference between successive lenses of the minor series. For example in the specific instance illustrated in which sixteen lenses have been provided in the minor series ranging from .25 diopters to 4.00 diopters, the difference between successive lenses of the major series is 4.25 diopters. Both a positive and a negative reading of refractory power may be secured by providing both positive and negative major lenses. For example in this specific instance the major lens powers run from zero to —25.75 diopters and likewise from zero to +17.0 diopters.

The members 74 and 75 are mounted so as to turn about the pin 34, the member 74 being journaled directly upon pin 34 and having a hub portion 81 which extends through the gear 41 previously described, and forms a journal for this gear. The drive mechanism or mechanical connection imposed between member 74 and 75 preferably includes an intermittent motion gear drive. For example as shown in Figs. 7 and 9 there is provided an element 82 which is journaled upon a projecting boss 83 provided upon the member 74. An angular ring 84, secured to one face of element 82, forms a journal for the rotatable member 75. The element 82 carries a projecting pin or tooth 86 which engages and effects intermittent motion of the slotted wheel 87. Since the wheel 87 is provided with four slots and there is only one tooth upon the rotatable element 82, for every complete revolution of element 82, the wheel 87 is rotated one quarter turn. Wheel 87 is suitably journaled upon a pin 88 projecting inwardly from the back plate 14, and carries a pinion 89 which meshes with a gear 91, gear 91 being imposed between the member 75 and the element 82. Since the wheel 82 is fixed with respect to the member 74, rotation of this member causes intermittent rotation of the slotted wheel 87 which because of pinion 89 and gear 91 causes intermittent rotation of gear 91.

A connection is provided between gear 91 and the movable member 75 but this connection is disengageable so as to permit movement of member 75 independently of member 74. For this purpose there has been provided an annular ring 93 which is set into a recess 94 provided in the rotatable member 75, and which is fixed to the gear 91. The ring 93 is provided with a number of slots 95 spaced about its periphery and these slots are adapted to be engaged by a locking bar 96. This locking bar is slidably disposed within a radial slot provided upon one face of the rotatable member 75 and is resiliently urged into locking engagement as by means of a spring 97. Normally the locking bar 96 projects beyond the periphery of the instrument and is provided with a finger hold portion 98 which is adapted to be moved outwardly by the operator to withdraw the locking bar 96. The finger hold portion 98 is preferably in the form of a lever pivotally secured to the outer end of locking bar 96 as by means of pin 99, the other end of the lever being provided with the lugs 101 which are normally disposed adjacent the peripheral portion 103 of the back plate 14. Spring 100 tends to resiliently urge the member 98 outwardly about its pivot. When the finger hold portion 98 is moved outwardly, it may be oscillated relative to the casing, carrying with it the major lens holding member independently of the minor lens holding member. In other words by means of this disengaging mechanism, the operator may selectively bring any major lenses in registry with the casing opening without laboriously turning the minor lens carrying member. Movement of the major lens carrying member is limited to less than one complete revolution, and near one limit of its movement, the peripheral portion 103 is extended to form a cam portion 104, which when it engages with the lugs 101, causes the locking bar 96 to become disengaged when the major lens holding member is in this position. To reengage the locking bar, it is only necessary to swing the finger hold portion 98 against the tension of spring 100 until the lugs 101 are disengaged from cam portion 104. Lugs 101 snap back in position after the locking bar has been moved away from portion 104. Thus referring to Figs. 8 and 9, if the major lens holding member 75 is turned manually to the limit of its movement in a clockwise direction, the cam surface 104 causes disengagement of the locking bar 96 so that the minor lens carrying member 74 may thereafter be rotated independently.

Rotation of the lens holding member 74 may be conveniently effected by means of a knurled finger hold portion 106 which is exposed at the edges of the casing. As has been previously explained, for every complete revolution of member 74 member 75 is moved an annular distance sufficient to bring a new major lens in registry with the casing opening. Accurate alinement of the spherical lenses upon these two members with the casing opening is secured by the use of the spring pressed detents 105 and 107 which are mounted within a member 108 secured to the back plate 14, which detents press against the respective peripheries of member 74 and 75. Notches 109 and 111 are provided in the peripheries of members 74 and 75 and are spaced so that when engaged by the detents 105 and 107, the lens carrying members are retained in the desired position. These detents also prevent direct turning of the major lens carrying member 75, through friction between that member and the member 74. The member 108 serves as a stop for limiting movement of the major lens holding member in one direction, while a pin 112 arrests movement in the other direction. The peripheral portion 103 of the back plate has been marked at spaced points with numbers corresponding to the different positions of the finger hold member 98. As shown in Fig. 1, the lens powers increase positively as the finger hold portion 98 is rotated in a counterclockwise direction until maximum positive power is reached, which in this instance is +17.00 diopters. The other limit of member 98 is also a position of zero power and as the member is rotated from this position in a clockwise direction, the lens powers decrease negatively from zero to −29.75 diopters. By means of this arrangement a gradual grading of lens powers may be obtained in the positive direction by rotating the minor lens carrying member in a counterclockwise direction, and a gradual increase in negative refractory power may be secured by rotating the minor lens carrying member in a clockwise direction, assuming of course that the member 98 has been moved to one of the negative positions.

As explained above, the lens powers are graded finely on member 74 and coarsely on member 75. As it is necessary to have a position of zero power for the device, member 74 has been provided with a blank space 76a and member 75 with two blank spaces 77a. Likewise a blank space 38a is provided on the spherical lens carrying member 37. Therefore both limits of movement of major lens carrying member 75 are zero lens power positions. With all the lens carrying members set to zero position, a complete rotation of member 74 may be effected before the lowest power lens of the major series is brought into registry with the casing opening and the blank space of member 74.

It will be noted that the distances between successive notches 109 on the member 74 are not all the same. One space "a" is substantially longer than the others. It is this space which is passing by detent 105 when movement of member 74 carries with it the major lens carrying member 75, and when the zero lens of member 75 is coming into registry with opening 75. Therefore when an operator is turning the member 74, he can tell by feel when zero position of this member is reached, and can therefore keep a check upon the approximate refractive power being used without referring to the indicating graduations. Another advantage of this construction is that it permits a greater gear ratio between pinion 89 and gear 91, thus making it easier to turn member 74 when member 75 is being shifted to a new position. It also provides for a certain amount of overthrow to take care of wear.

In order to indicate the exact refractive power of a spherical lens combination, the front plate 13 is provided with a window or opening 113 through which a portion of the face of the minor lens holding member may be viewed. Unobstructed view of the spherical lens holding members may be secured by providing a series of apertures 114 in the cylindrical lens carrying member 37. Likewise an arcuate slot 116 is provided in the center gear 53. The minor lens carrying member is provided with a series of smaller apertures 117 which come into alinement with the window 113 for the positions of registry for the lenses of this member. Figures 118 stamped along the edges of apertures 117 are visible through the window 113, and indicate the refractory power of the particular minor lens which is alined with the casing opening. The minor lens carrying member 75 is provided with markings 119, which may supplement the markings upon the periphery of the back plate 14. The markings 119 are adapted to register with the openings 117, and the particular marking visible through window 113 indicates the refractory power of that major lens which is alined with the casing opening. By algebraically adding the values of markings 118 and 119, the total refractory power of a particular lens combination can be obtained. In order to indicate the power of a cylindrical lens being employed, the front plate 113 is also provided with a window 121 through which markings 122 on the cylindrical lens carrying member 37, are visible.

In addition to the lens system described above, I have provided a screen which may be moved to obstruct the casing opening of one of the lens holding devices, or may be moved to provide a pin hole for adjusting the devices to the correct pupillary distance. This screen 124 is shown in Figs. 8 and 9 and is disposed within a recess provided upon the inner face of back plate 14. As shown in Fig. 7 it is provided with a pin hole 126 and a clear opening 127. The screen is arcuate in shape and is rotated as by means of a lever 128 which extends beyond the periphery of the casing. Suitable detents 129 are provided so as to properly aline the opening or pin hole.

Operation

The operation of the device may be outlined as follows:—Different powers of cylindrical lenses are secured by rotation of the control knob 44 which effects rotation of the cylindrical lens holding member 13. To effect axial rotation of a particular lens, the operator rotates knob 59 which effects rotation of the center gear 53 which meshes with the ring gears 51. Pointer 68 is rotated simultaneously with rotation of an alined lens and indicates the angular position of the lens axis. If the operator has an approximate idea of the refractive power of the spherical lens required, the member 98 is engaged and the major lens holding member 75 is quickly shifted to the approximate lens power as indicated by the markings upon the periphery 103. The minor lens holding member 74 is then rotated by engaging the peripheral portion 106, until the refractory power is graded to the exact value desired. If the minor lens holding member 74 is rotated sufficiently far, the drive connection provided between the spherical lens holding members causes the major lens holding member 74 to be shifted an annular distance sufficient to bring a new major lens into alinement with the casing opening. If member 98 is in position to secure positive refraction, the minor lens carrying member is rotated in a counter-clockwise direction to increase the refractory power of the spherical lens combination, while if member 98 is in a position to secure negative refraction, it is rotated in a clockwise direction to secure an increase negatively in refractory power. The refractory power of the cylindrical lens system is read through the window or opening 121, while that of the spherical system is read through opening 113.

One of the most important features of this invention is the ease and rapidity which the spherical lens system may be adjusted for different refractory powers. The operator usually has an idea of the approximate lens power required. The member 98 is set to this approximate power and then the minor lens holding member adjusted to secure the exact value. The particular form of cylindrical lens system described is desirable as it requires practically no power to operate, since only a small number of the ring or sun gears are rotated upon movement of the center gear. If all of the ring gears were rotated upon rotation of the center gear, the excessive wear would result in possible inaccuracies. In practically all cases sufficient refractive power may be obtained by merely superposing the spherical and cylindrical lenses provided. In case additional refractive power is desired, it may be secured by introducing the supplemental lens. It is to be also noted that the back plate is facing the patient and that therefore the major lenses are the nearest to the eye. It has been found that this arrangement which places the strongest lens nearest the eye of the patient, gives more accurate results in eye testing and decreases inaccuracies due to telescoping effect. In the adjustment of the device to increase or decrease the refractive power, no sudden changes in lens power occur and zero power position cannot be reached suddenly by adjustment of the minor lens carrying member 74. This inherent characteristic of the device reduces the possibility of errors in determining the accommodative scope of the eyes.

I claim:

1. In a device of the class described, a movable member carrying a plurality of minor lenses, another movable member carrying a plurality of major lenses, means mechanically connecting said members whereby upon movement of one of said members, any one major lens may be superposed with any one minor lens upon movement of one of said members, and means for disengaging said mechanical connection.

2. In a device of the class described, a movable member carrying a plurality of minor lenses, another movable member carrying a plurality of major lenses, means mechanically connecting said members whereby upon movement of one of said members, any one major lens may be superposed with any one of said minor lenses, and means for effecting manual movement of one of said members independent of said other member.

3. In a device of the class described, a movable member carrying a plurality of minor lenses, another movable member carrying a plurality of major lenses, means mechanically connecting said members whereby upon movement of one of said members, any one major lens may be superposed with any one of said minor lenses, and means serving to disengage said mechanical connection for permitting manual movement of said major lens carrying member independent of said minor lens carrying member.

4. In a device of the class described, a movable member carrying a plurality of minor lenses, another movable member carrying a plurality of major lenses, means mechanically connecting said members whereby upon movement of one of said members, any one major lens may be superposed with any one of said minor lenses, means for disengaging said mechanical connection, and means for effecting manual movement of said major lens carrying member independent of the other member while said mechanical connection is disengaged.

5. In a device of the class described, a rotatable member carrying a plurality of minor lenses, another journaled member carrying a plurality of major lenses, means mechanically connecting said members whereby upon manual rotation of one of said members any one major lens may be superposed with any one minor lens, and means for effecting selective manual turning of said major lens carrying member independent of said minor lens carrying member.

6. In a device of the class described, a rotatable member carrying a plurality of minor lenses, another oscillatory member carrying a plurality of major lenses, means mechanically connecting said members whereby upon rotation of one of said members, the other member is automatically rotated so that any one major lens may be superposed with any one minor lens and means for disengaging said mechanical connection when the major lens carrying member is turned to a position in which no major lens is operatively superposed with a minor lens.

7. In a device of the class described, a casing having an aperture therethrough, a pair of lens holding members mounted within said casing so as to turn about a common axis, one of said members carrying a plurality of major lenses and the other carrying a plurality of minor lenses, means mechanically connecting said members whereby upon rotation of one of said members, any one major lens may be superposed with any one minor lens in registry with said aperture, means operable to disengage said mechanical connection, and means for selectively turning said major lens carrying member independently of the other member while said mechanical connection is disengaged.

8. In an optometer, a rotatable disc carrying a plurality of spaced lenses of graded powers, a casing within which said disc is enclosed, said casing having an opening with which said lenses are adapted to be successively registered, said disc having an opening adjacent the lens of greatest power and adapted to register with the casing opening to form a zero setting, a detent engaging a peripheral portion of said disc, notches in said disc adapted to be engaged by the detent to retain the disc in lens registering positions, the spacing between two notches being greater than the spacing between the others, said greater space being arranged on said periphery so as to pass said detent when the disc opening is coming into registry with the casing opening.

9. In an optometer, a journaled member carrying a plurality of major lenses, another rotatable member carrying a plurality of minor lenses, a casing enclosing said members and having an opening, an intermittent motion mechanical drive interconnecting said members, said drive serving to move the major lens carrying member an angular distance upon the completion of every revolution of the minor lens carrying member, a peripheral portion on said minor lens carrying member, said portion having spaced notches, a detent adapted to engage in said notches for retaining the minor lenses in position to register with said casing opening, the spacing between notches which passes said detent at the end of a revolution of the minor lens carrying member being greater than the other spacing for the notches, the other spaces between notches being substantially equal.

10. In a device of the class described, a pair of casings each having an opening therethrough, means disposed in each casing for bringing different lenses in registry with said opening, means for adjusting the pupillary distance between said openings, and a screen associated with each casing and adapted to be moved across said opening, each screen having a pin hole for effecting an exact adjustment of the pupillary distance.

11. In a device of the class described, a casing having an opening therethrough, means disposed within the casing for bringing different lenses into registry with said opening, a screen movably disposed on said casing, said screen having a pin hole and a non-apertured portion whereby by movement of the screen, the opening may be entirely blanked off or the pin hole may be centered with respect to the opening.

12. In an optometer a casing having an opening extending therethrough, a tube rotatably journaled in said casing and having its center alined with the center of the opening, a pointer carried on the external portion of said tube, a rotatable member disposed within said casing, a plurality of lenses carried by said member and adapted to be successively registered with the opening, means for rotating said lenses when in registry with said opening, and means for simultaneously rotating said tube and pointer in unison with a registered lens.

13. In a device of the class described, a casing having an opening, a member rotatably mounted within said casing and a plurality of minor spherical lenses of finely graded powers, another oscillatable member disposed within the casing and carrying a plurality of major spherical lenses of coarsely graded positive and negative powers, a mechanical connection between said members whereby the major lens carrying member is moved an angular distance to bring a new major lens into registry with the casing opening upon completion of each revolution of the minor lens carrying member, and means for selectively oscillating the major lens carrying member to secure an approximate positive or negative refractive power without rotation of the minor lens carrying member.

14. In a device of the class described, a movable member carrying a plurality of minor lenses, another movable member carrying a plurality of major lenses, means mechanically connecting said members whereby upon movement of one of said members, any one major lens can be superposed with any one minor lens, a member manually movable to either one of two positions, and means cooperably associated with said member for disrupting said mechanical connection when said manually movable member is in one of said positions and to establish said connection when moved to the other of said two positions.

15. In an optometer, a casing having a sight opening, a plurality of major lenses disposed within the casing, a plurality of minor lenses also disposed within the casing, a member movable for successively registering said major lenses with said opening, a second member movable for successively registering said minor lenses with said opening, mechanical motion transmitting means interconnecting said members for causing intermittent movement of said first member upon movement of said second member, and means for effecting movement of said first member independently of said second member.

16. In an optometer, a casing having a sight opening, a plurality of major lenses disposed within the casing, said lenses being of graded powers and being in positive and negative groups, a plurality of minor lenses also disposed within the casing, a member movable for successively registering said major lenses with said opening, said positive lenses being registered with the opening for a portion of the extent of travel of said member and said negative lenses being registered for another portion of the extent of travel of said member, a second member movable for successively registering said minor lenses with said opening, mechanical motion transmitting means interconnecting said members for causing intermittent movement of said first member upon movement of said second member, whereby a plurality of minor lenses are successively registered with said opening before another major lens is registered with the opening, and means for effecting quick shifting movement of said first member from said first portion of its travel to said second portion independently of said second member.

17. In an optometer, a casing, a plurality of lenses disposed within the casing, said casing having an opening, means for effecting desired combinations of lenses in registry with said opening, a screen movably disposed within the casing, and a lever operably connected to the screen and extending exteriorly of the casing.

18. In an optometer, a casing having front and back plates, the back plate being adapted for positioning near the eye of a patient, said casing having a sight opening therethrough, a plurality of lenses within the casing, means for effecting desired combinations of lenses in registry with said sight opening, a screen movably mounted on the casing in close proximity to said back plate, said screen having an opening of size comparable to said sight opening and also a pinhole opening, and means for moving said screen whereby either the opening in the same or the pin hole can be registered with said sight opening.

19. In an optometer, a casing having front and back plates, the back plate being adapted for positioning near the eye of a patient, said casing having a sight opening therethrough, a plurality of lenses within the casing, means for effecting desired combinations of lenses in registry with said sight opening, a screen movably mounted on the casing in close proximity to said back plate, said screen having an opening of size comparable to said sight opening and also a pin hole opening, the inner face of said back plate having a recess to receive said screen, and means for moving said screen whereby either the opening in the same or said pin hole can be registered with said opening.

20. In an optometer, a movable member carrying a plurality of minor lenses, another movable member carrying a plurality of major lenses, means mechanically connecting said members whereby upon movement of one of said members any one of a number of major lenses can be superposed with any one of said minor lenses, and means operative upon movement of one of said members beyond a certain amount in one direction for effecting disengagement of said mechanical connection.

21. In an optometer, a movable member carrying a plurality of minor lenses, another movable member carrying a plurality of major lenses, means mechanically connecting said members whereby upon movement of one of said members any one of a number of major lenses can be superposed with any one of said minor lenses, and cam means automatically operative upon movement of one of said members beyond a certain amount in one direction for effecting disengagement of said mechanical connection.

22. In an optometer, a movable member carrying a plurality of minor lenses, another movable member carrying a plurality of major lenses, means mechanically connecting said members whereby upon movement of one of said members any one of a number of major lenses can be superposed with any one of said minor lenses, means including a bar movably connected to said major lens carrying member and movable to one position for disengaging said mechanical connection and to another position for establishing said connection, and means for moving said bar to said one position upon moving said major lens carrying member beyond a certain amount in one direction.

23. In an optometer, a casing, a pair of rotatable lens carrying discs positioned within the casing, a locking bar slidably carried by one of said discs, motion transmitting mechanism connecting said discs, said mechanism being disrupted for one position of said bar and operable for another position of said bar, and cam means for moving said bar to said one position responsive to rotation of said one disc beyond a certain amount in one direction.

24. In a device of the class described, a member having a sight opening, means carrying a plurality of graded lenses adapted to successively register a lens with said opening, an auxiliary lens, and means for detachably securing said auxiliary lens to said member in registry with said opening, said means being engageable upon relative rotation between said auxiliary lens and said member.

25. In a device of the class described, a member having a sight opening, means carrying a plurality of graded lenses positioned on one side of said member and adapted to successively register a lens with said opening, an auxiliary lens, a mounting for said auxiliary lens, and means for detachably securing said mounting to the other side of said member with the auxiliary lens in registry with said opening, said means including a tab projecting from the mounting, and a projecting portion secured to said member engageable with said tab upon axial rotation of the mounting relative to said member.

26. In a device of the class described, a member having a sight opening, means carrying a plurality of graded cylindrical lenses disposed on one side of said member, means for bringing said lenses into successive registry with said opening, and means for effecting axial rotation of an individual lens in registry with said opening without rotating certain others of said lenses not in registery with said opening, said last mentioned means including a gear journaled to said member, a gear segment connected to said gear, a pinion journaled to said member and cooperably engaging said segment, and means for effecting manual rotation of said pinion.

27. In a device of the class described, a member having a sight opening, means carrying a plurality of graded cylindrical lenses disposed in one side of said member, means including a manually operable knob journaled on the other side of said member for bringing said lenses into successive registry with said opening, and means including another manually operable knob journaled adjacent to said first knob for effecting axial rotation of a lens in registry with said opening without rotating certain others of said lenses not in registry with said opening.

In testimony whereof, I have hereunto set my hand.

CLYDE L. HUNSICKER.